Figure 1:
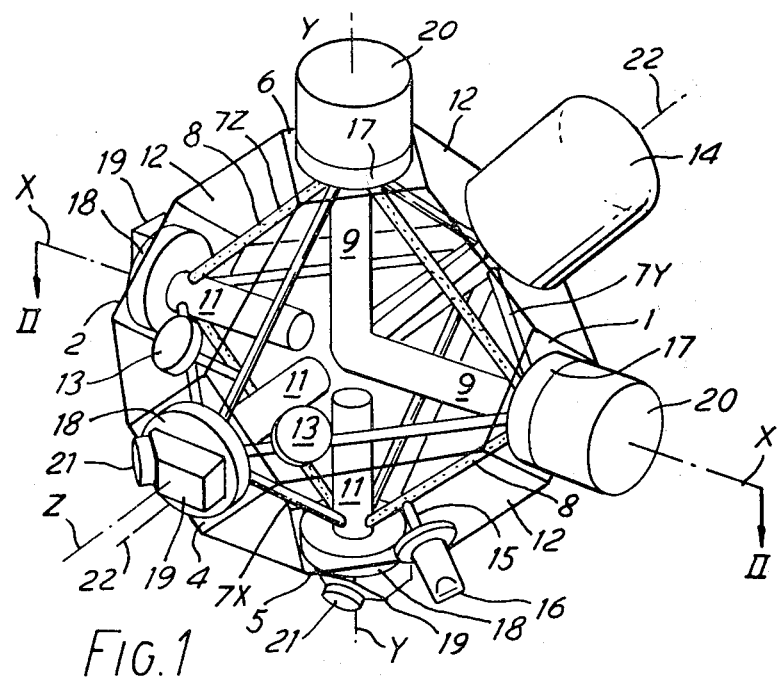

United States Patent [19]

Simms

[11] 4,407,583

[45] Oct. 4, 1983

[54] RING LASER GYROSCOPES

[75] Inventor: Graham J. Simms, Reading, England

[73] Assignee: British Aerospace Public Limited Company, London, England

[21] Appl. No.: 255,018

[22] Filed: Apr. 17, 1981

[30] Foreign Application Priority Data

May 9, 1980 [GB] United Kingdom ............... 8015477

[51] Int. Cl.³ ............................................. G01C 19/64
[52] U.S. Cl. ....................................... 356/350; 372/94
[58] Field of Search ...................... 356/350; 372/93, 94

[56] References Cited

U.S. PATENT DOCUMENTS 3,484,169  12/1969  Skalski et al. ....................... 356/350
3,503,688  3/1970  Lechevalier ........................ 356/350

Primary Examiner—Vincent P. McGraw

Attorney, Agent, or Firm—Cushman, Darby & Cushman

[57] ABSTRACT

A ring laser gyroscope having a plurality of sensitive axes (X, Y, Z) and hence a plurality of cavities (7X, 7Y, 7Z), the cavities lying in mutually orthogonal planes at right angles to the respective sensitive axes and each cavity having three or more corners arranged so that at least one corner coincides with a corner of another cavity, whereby the cavities are interconnected, the gyroscope further comprising a plurality of mirrors (17,18) disposed respectively at the coinciding corners and the remaining corners of the cavities (7X, 7Y, 7Z), whereby the number of mirrors is less than the total number of cavity corners, the mirrors at the coinciding cavity corners and the coinciding cavities being oriented such that the normal to each of these mirrors lies in the plane of each cavity it serves and bisects the associated corners of those cavities.

8 Claims, 2 Drawing Figures

U.S. Patent     Oct. 4, 1983     4,407,583

RING LASER GYROSCOPES

This invention relates to ring laser gyroscopes and more particularly to such gyroscopes having a plurality of sensitive axes.

Ring laser gyroscopes have one or more sensitive axes and for each axis there is provided a gas-filled cavity or ring disposed in a plane at right angles to the associated axis, each cavity comprising three or more linear, and usually equal, limbs. Around each cavity propagate two beams of light travelling in opposite directions and directed about a closed loop, by three or more mirrors located at the respective cavity corners, and regeneratively amplified at frequencies for which the path length equals an integral number of wavelengths. Amplification is achieved through a gas discharge within the cavity, at least one anode and one cathode being provided in each cavity.

The corner mirrors of laser gyroscope cavities are very expensive components since they have to have excellent optical characteristics. A single-axis ring laser gryoscope having a three-corner cavity employs three mirrors, a two-axis, three-corner cavity ring laser gyroscope employs six mirrors and a three-axis, three-corner cavity ring laser gyroscope employs nine mirrors and in each case, the mirrors constitute a significant proportion of the cost of the gyroscope.

It is the object of the present invention to provide a ring laser gyroscope which employs a reduced number of mirrors.

According to the present invention there is provided a ring laser gyroscope having a plurality of sensitive axes and hence a plurality of cavities, the cavities lying in mutually orthogonal planes at right angles to the respective sensitive axes and each cavity having three or more corners arranged so that at least one corner coincides with a corner of another cavity, whereby the cavities are interconnected, the gyroscope further comprising a plurality of mirrors disposed respectively at the coinciding corners and the remaining corners of the cavities, whereby the number of mirrors is less than the total number of cavity corners, the mirrors at the coinciding cavity corners and the coinciding cavities being oriented such that the normal to each of these mirrors lies in the plane of each cavity it serves and bisects the associated corners of those cavities.

As the cavities are interconnected, a common gas system can be used for the cavities and the latter can be machined out of a single block of material, whereby the overall gyroscope occupies less space than two or more separate single-axis gyroscopes arranged to provide a multi-axis instrument. However, when employing three-corner cavities, the block of material from which they are machined is either an irregularly shaped, or an awkwardly shaped, solid sphere which can give rise to difficulties both in machining and in mounting the mirrors and other components on the block.

Accordingly, a preferred embodiment of the present invention provides a three-axis ring laser gyroscope comprising three four-corner cavities arranged in mutually orthogonal planes at right angles to the respective sensitive axes and with each corner of one cavity coinciding with one corner of another cavity, whereby the cavities are interconnected, and six mirrors disposed respectively at the coinciding cavity corners, whereby the number of mirrors is less than the total number of cavity corners, the mirrors at the coinciding cavity corners and the coinciding cavities being oriented such that the normal to each of these mirrors lies in the plane of each cavity it serves and bisects the associated corners of those cavities.

With this arrangement, the three cavities can be machined from a cube of material which is a very convenient shape for this purpose, whereby the cavities can be accurately located in mutually orthogonal planes. Furthermore, the gyroscope is extremely compact, the volume depending on the size of cavity required. This may be comparatively small in missile applications, for example, where only short-term accuracy is required, whereas in other applications the path length may have to be increased to provide long-term accuracy because path length is an important factor in this respect. As the gyroscope is contained within a single block of material, it is of rugged construction which is a requirement of many present-day applications of laser gyroscopes.

Once the machining of the cavities has been completed, it is possible to take off the corners of the cube of material to reduce the bulk of material, and to provide mounting faces for components such as anodes and cathodes.

Each cavity may be provided with means for controlling the path length of the cavity, the means being located at the corner, or one of the corners, which coincides with a corner of another cavity, whereby each path length control means serves two cavities. The path length can be controlled in all three cavities by the combined operation of the three control means. The path length control means may be in the form of conventional diaphragm mirrors (which may be plain or curved) constituting three of the six mirrors of the gyroscope, with the remaining three mirrors each being in the form of a conventional output mirror (which may also be plain or curved) which embodies a combiner prism and double element detector.

Figure 2:
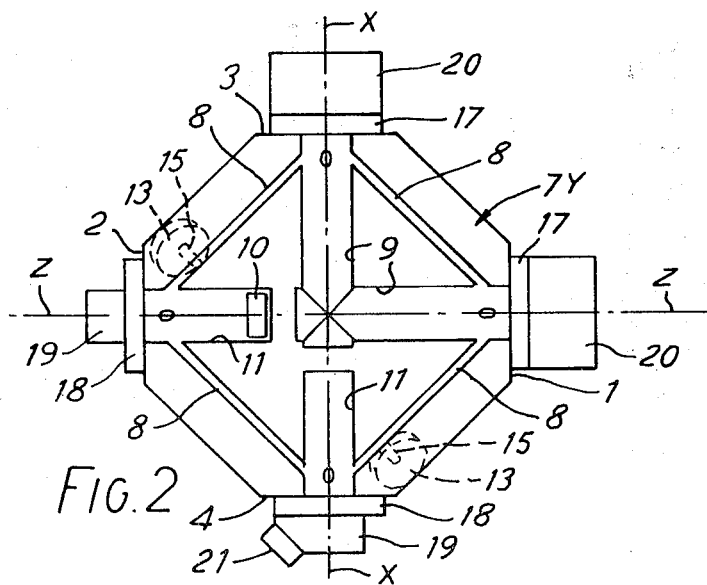

A three-axis ring laser gyroscope for an inertial navigation system and constructed in accordance with the present invention will now be described in greater detail by way of example, with reference to the accompanying drawings, in which:

FIG. 1 is a diagrammatic perspective view of the gyroscope showing the internal detail, and FIG. 2 is a section on the line II—II of FIG. 1.

The actual body of the laser gyroscope is produced from a cube of dielectric material having a low coefficient of expansion, one such material being that known under the trade name Zerodur and which is a glass ceramic having an extremely low coefficient of expansion. This material is also transparent which is why internal detail is seen in FIG. 1.

Referring to FIGS. 1 and 2, the faces of the cube of material are indicated at 1, 2, 3, 4, 5 and 6 and the three axes X, Y and Z pass through the centre of opposed pairs of faces. Three cavities (generally indicated at 7X, 7Y and 7Z in FIG. 1) are formed in the cube of material at right angles to the respective axes X, Y and Z and each cavity is in the form of a square having four equal limbs 8 as seen in FIG. 2. For ease of identification, the cavity 7X has been shaded and the cavity 7Z cross hatched in FIG. 1. The limbs 8 of the three cavities are produced by drilling 1 mm. diameter holes from the centre of each face 1–6 fo the centre of each of the four adjacent faces. Thus the centre of each face 1–6 becomes a cavity corner which is common to two cavities, all three cavities 7X, 7Y and 7Z therefore being interconnected. The length of each cavity limb 8 in this embodiment is 40 mm. which gives a cube size of $40\sqrt{2}$ mm.

It should be noted the cavity limbs 8 are drilled with the cube of material in its basic form and not yet cut away to produce the shape seen in FIGS. 1 and 2. This greatly facilitates these machining operations which are followed by drilling 8 mm. diameter holes from the centre of each face 1–6, and at right angles thereto, the holes 9 and 11 drilled from each pair of opposed faces being of different lengths. Each of the three holes 9 extends to the centre of the cube and hence intersects the other two holes 9, whilst each of the three holes 8 stops short of the cube centre and is thus a blind bore.

This represents the totality of the required drilling operations to form the three basic cavities 7X, 7Y and 7Z all of which operations can be accomplished with great accuracy since the regular nature of the cube provides a sound datum for each drilling. Once the drilling has been completed, the corners of the cube are removed to produce eight generally triangular, planar faces 12 the sides of which lie parallel to the respective cavity limbs 8 disposed immediately adjacent thereto. This operation reduces the weight of the gyroscopic element and also provides the planar faces 12 on which to mount further components of the gyroscope such as anodes 13 and a single cathode 14. The final drilling operations are by way of providing a hole from the face 12 on which the cathode 14 is mounted to the centre of the cube, so as to link all three cavities 7X, 7Y and 7Z, as far as the cathode is concerned, via the holes 9, and providing holes 15 extending from the faces 12 on which the anodes 13 are mounted to the adjacent cavity limbs 8. FIG. 2 shows both anodes 13 of the cavity 7Y to illustrate the arrangement but it should be noted that the right-hand anode is above the plane of the section of FIG. 2 and would not normally be shown.

Each cavity 7X, 7Y and 7Z has two anodes 13 (only one for each cavity being seen in FIG. 1) disposed in the pair of opposed limbs 8 which extend between a hole 9 and a hole 11 and offset as close as possible to the hole 11 as is best seen in FIG. 2. In this way, the anode-cathode separation is maximised which is desirable in order to achieve adequate gain which is proportional to that separation and to the anode-cathode current, and inversely proportional to the cavity limb diameter.

If the anode-cathode separation is maximised, there is a risk of anode-to-anode discharge between cavities on start up and means to prevent this may have to be employed. Also with this arrangement, visible discharge takes place only in the opposed limbs 8 of each cavity which interconnect with the related anodes 13, it being appreciated that the cavities are filled, after final assembly, with a gas, such as a helium/neon mix, which supports lasing action. One of the anodes 13 is fitted with a fill tube 16 for the gas and a getter 10 is provided in one of the holes 11. The getter may be of the light-activated, non-evaporable, zirconium-carbon type or one of the heat-activated type, for example, and is operable to maintain fill gas purity over a long period of time. A mirror is provided at each corner of each cavity 7X, 7Y and 7Z but as each corner of one cavity coincides with one corner of another cavity by virtue of the provision of the holes 9 and 11, there is a requirement for only six mirrors which is half the total number of cavity corners. More specifically, three path length control mirrors 17 are sealed to the respective centres of the cube faces 1, 3 and 6 (so as to serve the cavities 7Y, 7Z; 7X, 7Y; and 7X, 7Z respectively) and three output mirrors 18 are sealed to the cube faces 2, 4 and 5 (so as to serve the cavities 7Y, 7Z; 7X, 7Y; and 7X, 7Z; respectively). The mirrors 17 may be curved or plain and are preferably of the diaphragm type movable by a piezo-electric transducer mounted adjacent the mirror in a housing 20 to compensate for any change in path length of a cavity which may occur in operation of the gyroscope due to a number of well known factors. For a given cavity 7X, 7Y and 7Z two of the three path length control mirrors 17 lie in the plane thereof and any adjustment is in the same sense as far as that cavity is concerned but the third mirror 17 not in the plane of that cavity will be adjusted in the opposite sense. Accordingly, path length control has to be effected by adjusting all three mirrors 17 simultaneously, this being achieved by an electronic circuit (not shown) which provides the signals for the piezo-electric transducers which in turn move the diaphragms of the mirrors 17.

The output mirrors 18 may also be curved or plain and each has a conventional combiner prism 19 attached thereto to provide fringes for a double element photo-detector 21 associated therewith. The detectors 21 also provide feedback for path length control of the cavities 7X, 7Y and 7Z. Whilst each mirror 18 serves two cavities 7X, 7Y and 7Z as indicated above, the combiner prism 19 is oriented so as to operate on the light beams of one of the two associated cavities. For example, the combiner prism 19 seen in the eight o'clock position in FIG. 1 outputs the light beam from cavity 7Y and not cavity 7X which it also serves.

In order for a mirror 17, 18 to serve two of the cavities 7X, 7Y and 7Z, it has to be oriented so that its normal lies in both cavity planes and bisects the angles of the associated cavity corners. This means that some possible cavity arrangements as regards coinciding corners are not acceptable since they will be such that the mirror normal does not lie in the cavity planes concerned and/or do not bisect the related cavity corners. However, there is no difficulty in these respects with the illustrated arrangement.

The sealing of the anodes 13, cathode 14 and mirrors 17 and 18 to the respective faces of the block of material can be effected by any technique which will provide a gas-tight seal.

As is well known, there are many effects which degrade the performance of a ring laser, the majority being linked in some way to the amount of light which is lost in traversing the ring or cavity. One of the most dominant, and hence troublesome, effects is that known as lock-in which is caused by light scattered from each beam in a cavity interacting with the counter-rotating beam, thereby suppressing the frequency difference at low rotational rates and making the frequency difference non-linear at just above the lock-in frequency.

The problem of lock-in can be obviated by imparting a bias to the ring laser gyroscope to ensure that operation is on a linear portion of the graph of frequency difference versus rotational rate, whereby low rotational rates can be detected. In the present embodiment this bias is effected by subjecting the gyroscope to mechanical oscillation about an axis 22 which extends through one pair of opposed corners of the original cube of material. The so-called "dither" technique is well known and will not be described further. In any event, the type of bias used for the gyroscope does not form part of the present invention. Suffice it to say that the dither axis 22 extends at an angle to each of the sensitive axes X, Y, Z of the gyroscope and hence there will be a component of the mechanical oscillation about all three axes which is essential.

In operation, the anodes 13 and the cathode 14 are energised to effect, as described, laser discharge in each cavity 7X, 7Y and 7Z, whereby two beams of light are propagated around each cavity in opposite directions, being directed around the cavity by the corner mirrors 17 and 18. The two beams of light are combined by the combiner prism 19 associated with each cavity and in the absence of rotation of the gyroscope about the sensitive axis associated with a cavity, the detector 21 will not see any interference fringes arising from the two combined beams. However, upon rotation of the gyroscope about one or more of its sensitive axes X, Y, Z, the optical path length of one beam of the associated cavity or cavities will increase and the other will decrease thus giving rise to interference fringes in the combined beams which the related detector counts, the fringe count being directly proportional to the total angle turned through by the gyroscope provided the two beams of light are completely uncoupled, i.e. there is an absence of lock-in. Thus rotational rates can be measured about each of the three sensitive axes X, Y, Z and used in the inertial navigation system of which the gyroscope forms part.

As already explained, the present invention effects a reduction in the number of mirrors which have to be employed in a multi-axis ring laser gyroscope and in the case of the illustrated embodiment there is a 50% saving. Even in relation to the more normal use of three-corner cavities there is a 33⅓% saving, both savings being very significant in terms of cost. However, other advantages flow from the basic inventive concept which, in relation to the illustrated embodiment, are as follows:

1. The gyroscope can be machined out of a cube of material which makes the achievement of orthogonal cavities a relatively simple matter.
2. The gyroscope occupies a minimum volume which is generally important and especially so in aeronautical applications.
3. The gyroscope is rugged.
4. A single gas system for all cavities can be provided.
5. Only one cathode is necessary.

I claim:

1. A ring laser gyroscope having a plurality of sensitive axes and hence a plurality of cavities, the cavities lying in mutually orthogonal planes at right angles to the respective sensitive axes and each cavity having three or more corners arranged so that at least one corner coincides with a corner of another cavity, whereby the cavities are interconnected, the gyroscope further comprising a plurality of mirrors disposed respectively at the coinciding corners and the remaining corners of the cavities, whereby the number of mirrors is less than the total number of cavity corners, the mirrors at the coinciding cavity corners and the coinciding cavities being oriented such that the normal to each of these mirrors lies in the plane of each cavity it serves and bisects the associated corners of those cavities.

2. A three-axis ring laser gyroscope comprising three four-corner cavities arranged in mutually orthogonal planes at right angles to the respective sensitive axes and with each corner of one cavity coinciding with one corner of another cavity, whereby the cavities are interconnected, and six mirrors disposed respectively at the coinciding cavity corners, whereby the number of mirrors is less than the total number of cavity corners, the mirrors at the coinciding cavity corners and the coinciding cavities being oriented such that the normal to each of these mirrors lies in the plane of each cavity it serves and bisects the associated corners of those cavities.

3. A gyroscope according to claim 2, wherein the gyroscope body is formed from a cube of dielectric material with the limbs of each cavity being of equal length and each limb extending from the centre of one external face of the cube to the centre of an adjacent external face, and wherein holes are provided at the centre of each external cube face and at right angles thereto, the mirrors being sealed to the respective cube faces over said holes.

4. A gyroscope according to claim 3, wherein for a given cavity, two of the four holes provided at the centre of the cube faces and at right angles thereto extend to the centre of the cube and thus interconnect with similar holes associated with the other cavities, whereas the other two holes terminate short of the cube centre, and wherein a single cathode is provided which connects with all three cavities via a hole extending from a mounting face for the cathode to the centre of the cube.

5. A gyroscope according to claim 4, wherein the mounting face for the cathode is provided by cutting away the corners of the cube to form eight generally triangular and planar mounting faces, the sides of the triangle extending parallel to the respective cavity limbs disposed immediately adjacent thereto, the cathode being connected to the three cavities by a hole extending from the cathode mounting face to the centre of the cube.

6. A gyroscope according to claim 5, wherein each cavity is provided with two anodes mounted on a respective one of the eight mounting faces and being connected to the cavity by holes extending from those mounting faces to the adjacent limb of the cavity.

7. A gyroscope according to claim 6, wherein the anodes for each cavity are associated with opposed limbs thereof each of which extend between one of said holes extending from a cube face to the centre of the cube and one of said holes extending from another cube face and terminating short of the cube centre.

8. A gyroscope according to claim 6 or 7, wherein one of the anodes is apertured and provided with a sealable fill tube via which the cavities are filled with the required gas.

* * * * *